Patented Mar. 7, 1939

2,149,937

UNITED STATES PATENT OFFICE 2,149,937

ABSORPTION MEDIUM

Michael J. Copley, Urbana, Ill., assignor to Glenn F. Zellhoefer, Normal, Ill.

No Drawing. Application February 16, 1938, Serial No. 190,702

10 Claims. (Cl. 252—5)

This invention relates to refrigeration, and more particularly to refrigeration by means of the absorption refrigeration principle.

One of the objects of the present invention is to provide a new and improved working fluid or medium for an absorption refrigerating system.

A further object is a working fluid of the character described, wherein the solvent component exhibits a negative catalytic effect on the corrosion of the metallic parts of the machine by the refrigerant component.

Another object is a working fluid for an absorption machine, wherein the solvent component tends to stabilize the refrigerant component.

A still further object is a refrigerant-solvent combination in which the corrosive tendencies of the refrigerant are inhibited by the solvent.

Other objects will become apparent as the invention is hereinafter more fully described.

The foregoing objects may be accomplished in accordance with the present invention, one aspect of which consists of a working fluid or medium comprising a hydrogen-containing halogenated hydrocarbon as a refrigerant, and an organic ester of a phosphoric acid as an absorbent or solvent for said refrigerant.

The refrigerant component of the present invention consists of a relatively volatile halogenated hydrocarbon which contains within its structure at least one hydrogen atom. Thus, the refrigerant may contain the bivalent monohalomethylene group

where X is a halogen. This grouping is found, for example, in compounds having the general formula

where $R^1$ and $R^2$ are hydrogen, halogen, alkyl, haloalkyl or the like, either the same or different; and X is a halogen atom, such as chlorine, fluorine or the like. As specific examples, mention may be made of the following: methyl chloride, methylene chloride, monochlorodifluoromethane, dichloromonofluoromethane, ethyl chloride, ethylene chloride, 1,1,2-trifluoro-2-chloroethane, sym. tetrafluoroethane and the like. The foregoing compounds are mentioned merely by way of example, and serve to indicate the broad scope of the present invention.

The solvent or absorbent component of the present invention is an organic ester of a phosphoric acid, such as the phosphates of the aliphatic alcohols. Thus, the solvent may consist of the alkyl phosphates derived from the lower molecular weight alcohols. As specific examples, triethylphosphate, tripropyl phosphate, tributyl phosphate, and the like, may be mentioned.

When the refrigerant and solvent components of the present invention are mixed together, it appears that intermolecular hydrogen bonding takes place between the hydrogen atom of the refrigerant component and the effective pair of unshared valence electrons of the donor oxygen atom in the prosphate. The effect may be represented in the following manner:

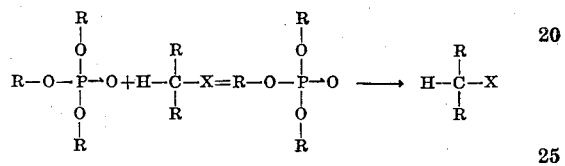

In other words, a loose, molecular-type of compound appears to be formed between the refrigerant and the solvent.

Whether the foregoing is a correct explanation or not, the resulting fluid exhibits properties which are especially advantageous in a working fluid for an absorption refrigerating system. In the first place, the solvents of the present invention are characterized by a large capacity for dissolving hydrogen-containing halogenated hydrocarbons. This will be evident from an inspection of Table I, which gives the solubility of methylene chloride and dichloromonofluoromethane in representative esters in accordance with the present invention, solubility being expressed in terms of grams refrigerant per gram solvent.

Table I

| Solvent | Solute | |
|---|---|---|
| | $CHCl_2F$ | $CH_2Cl_2$ |
| Triethyl phosphate | 1.13 | 0.55 |
| Tri-n-propyl phosphate | | 0.5 |
| Tri-n-butyl phosphate | 0.83 | 0.43 |

The data given in the foregoing table represent the solubility of the refrigerant when the solvent was maintained at 90° F. and the pressure over the solution corresponds to the vapor pressure of the liquid refrigerant at 40° F. For dichloromonofluoromethane the pressure was 4½ inches of vacuum; for methylene chloride, the pressure was 23 inches of vacuum.

In addition to possessing a large capacity for dissolving the above mentioned class of halogenated hydrocarbons, the solvents of the present invention exhibit a pronounced corrosion-inhibiting effect when the solution is in contact with the metals commonly employed in the construction of a refrigerating machine. Apparently the solvent acts as a negative catalyst to the hydrolytic decomposition of the halogenated hydrocarbon, and thereby inhibits the corrosive action of the refrigerant. At any rate, the resulting working fluid is superior in this regard to corresponding working media wherein another solvent is substituted for that employed in accordance with the present invention.

In addition to the foregoing advantages, the solvents of the present invention are high boiling liquids of low viscosity and the resulting refrigerant-solvent solution has good heat exchange capacities.

In the foregoing detailed description of the present invention, certain aspects thereof have been illustrated by reference to an absorption refrigerating system of the two-fluid type. It should be understood, however, that the invention may be used, if desired, in the Platen-Munters three-fluid system, by supplementing the disclosed two-fluid combination with a third fluid such as hydrogen. It will also be apparent that the absorbent or solvent of the present invention may be utilized for other purposes besides the production of cold. Thus, for example, the phosphates may be employed merely for the purpose of absorbing hydrogen-containing halogenated hydrocarbons from gases and vapors containing the same, without subsequently utilizing the resulting solution for the production of cold. It will also be evident that the phosphates may be employed merely for the purpose of stabilizing halogenated hydrocarbons. These and many other variations will be evident to those skilled in the art. The present invention is therefore to be restricted only in accordance with the prior art and the following patent claims.

I claim:
1. A working fluid for an absorption refrigerating system, comprising a volatile hydrogen-containing halogenated aliphatic hydrocarbon as a refrigerant and an ester of a phosphoric acid and low molecular weight aliphatic alcohols as the absorbent.
2. A working fluid for an absorption refrigerating system, comprising a volatile hydrogen-containing halogenated aliphatic hydrocarbon as the refrigerant, and a phosphate of a low molecular weight aliphatic alcohol as the absorbent.
3. A working fluid for an absorption refrigerating system, comprising a volatile hydrogen-containing halogenated aliphatic hydrocarbon as the refrigerant, and a phosphate selected from the group consisting of triethyl phosphate, tripropyl phosphate, and tributyl phosphate, as the absorbent for said refrigerant.
4. The working fluid of claim 3 wherein said halogenated hydrocarbon is a hydrogen-containing halomethane.
5. The working fluid of claim 3 wherein said refrigerant comprises methylene chloride.
6. The working fluid of claim 3 wherein said refrigerant is a dichloromonofluoromethane.
7. The process of absorbing vapors and gases of hydrogen-containing halogenated aliphatic hydrocarbons which includes contacting said vapors and gases with an absorption medium comprising an organic phosphate of a low molecular weight aliphatic alcohol.
8. In the production of cold by the absorption refrigerating principle, the step which includes vaporizing a volatile hydrogen-containing halogenated aliphatic hydrocarbon refrigerant and absorbing said vapors in an absorption medium comprising a phosphate of a low molecular weight aliphatic alcohol.
9. A composition comprising a volatile hydrogen-containing halogenated aliphatic hydrocarbon hydrogen bonded to a lower alkyl phosphate.
10. A working medium for an absorption refrigerating system comprising methylene chloride and triethyl phosphate.

MICHAEL J. COPLEY.